INVENTOR.
WILLIAM A. HEINE JR.

ATTORNEY

INVENTOR.
WILLIAM A. HEINE JR.
BY
ATTORNEY

3,188,944
SEQUENTIAL WIRE MARKER
William A. Heine, Jr., Mountainside, N.J., assignor to The Acromark Company, Elizabeth, N.J.
Filed Mar. 21, 1963, Ser. No. 267,023
1 Claim. (Cl. 101—8)

This device is designed to measure a continuous article as it is dispensed, and to imprint the measurement upon the surface of the article at regular intervals as it passes through the device. It is applicable to any such continuous article such as hose, tubing, rope or strip or other form of continuous material as they are manufactured, processed or dispensed. The usages and advantages of such regular length markings are numerous and are associated with the particular items concerned.

In the presentation given herein the device is particularly applied to the laying of electric cables as they are laid in ditches over uneven territory. Such markings permit an accurate accounting to be made not only of the cable used but also of the trench in which it is buried.

Moreover, the dispensation of random lengths from a large stock can be more efficiently performed where the material itself is continually marked as to length.

It is an object of this invention to pass the cable or other strip form through a machine in order to impress an insignia upon the item as it passes which will accurately mark the length of this item from the point of beginning. This enables the user of the product to determine accurately the length used, the length dispensed, and to further accurately determine the length remaining on the stock reel, these determinations thus accurately made by the record imprinted on the product. It can also be arranged alternately to mark a trademark or other identification on the product.

In accordance with this invention there is provided a machine in which the marking is done from a pigmented tape through the application of heat and pressure, the pigment being so impressed upon the surface or alternately into the surface of the product as to make a durable record.

Figure 1:
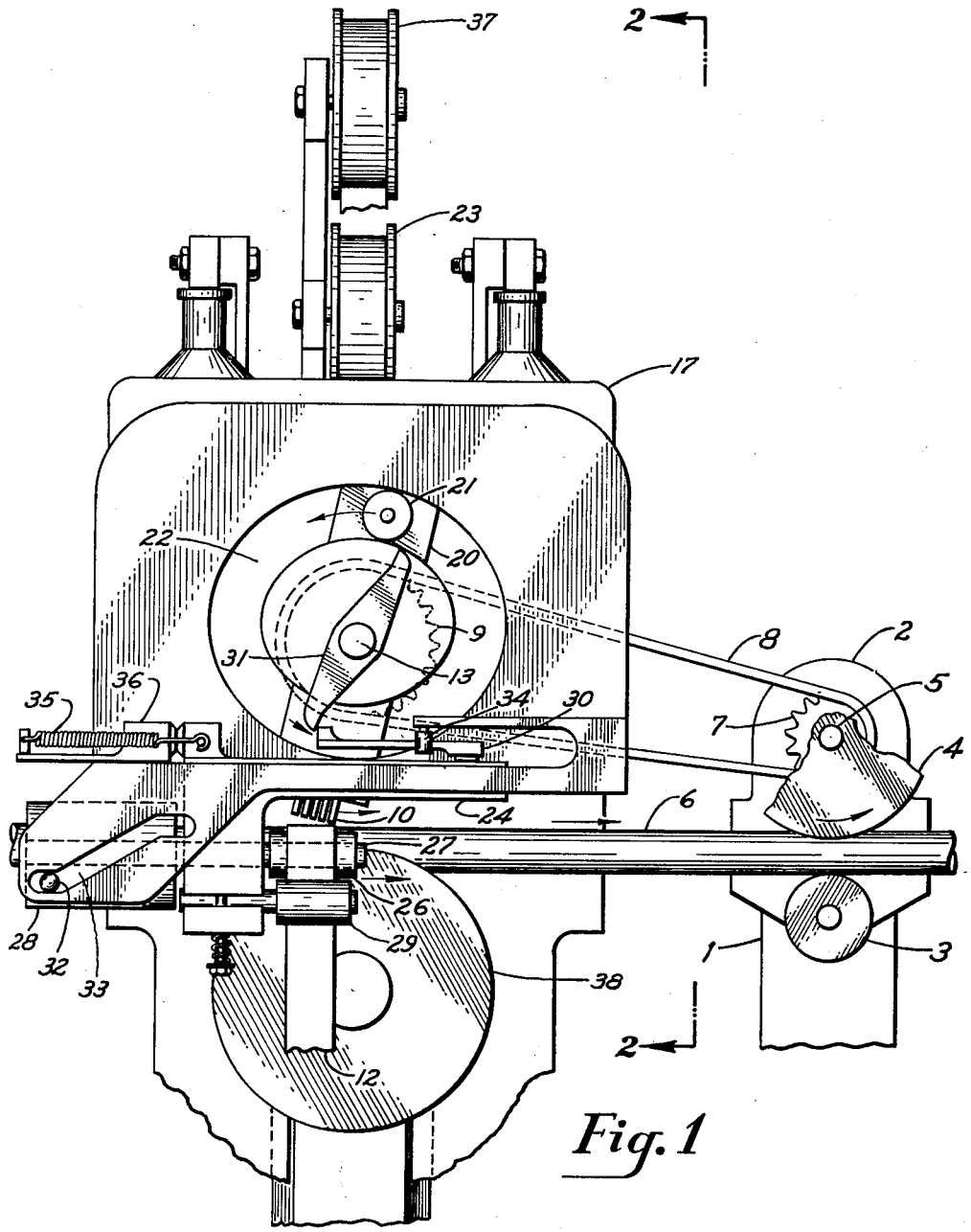
Figure 2:
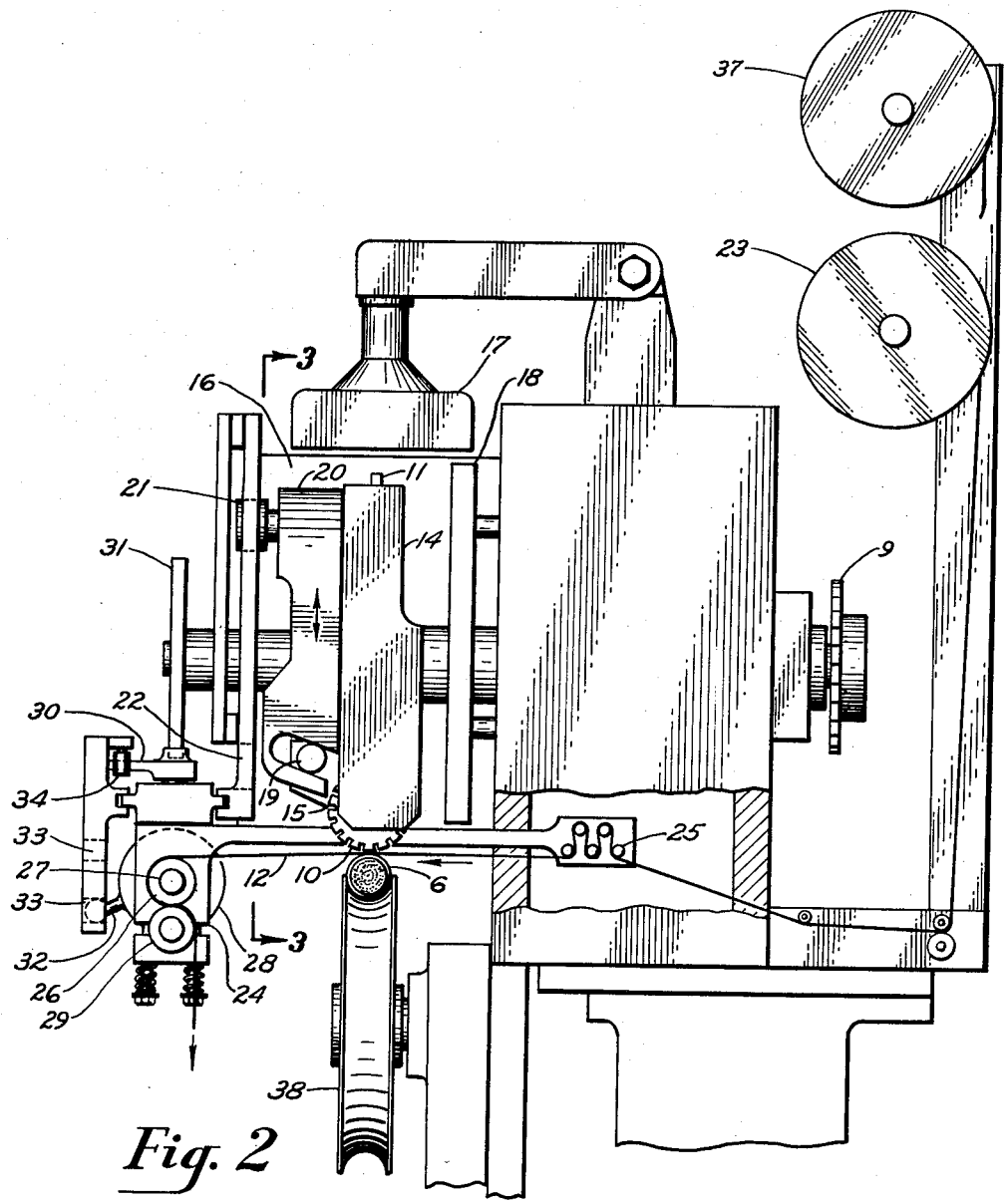
Figure 3:
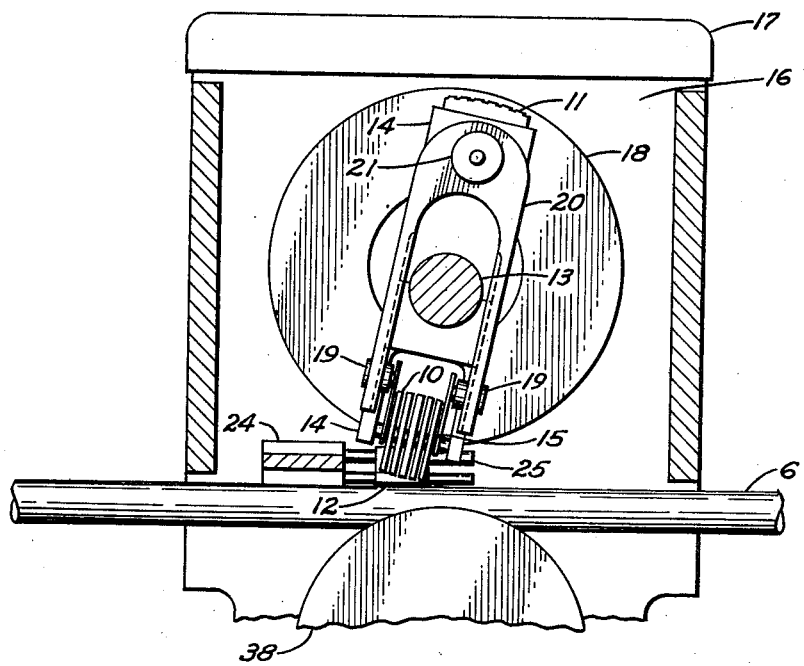
Figure 4:
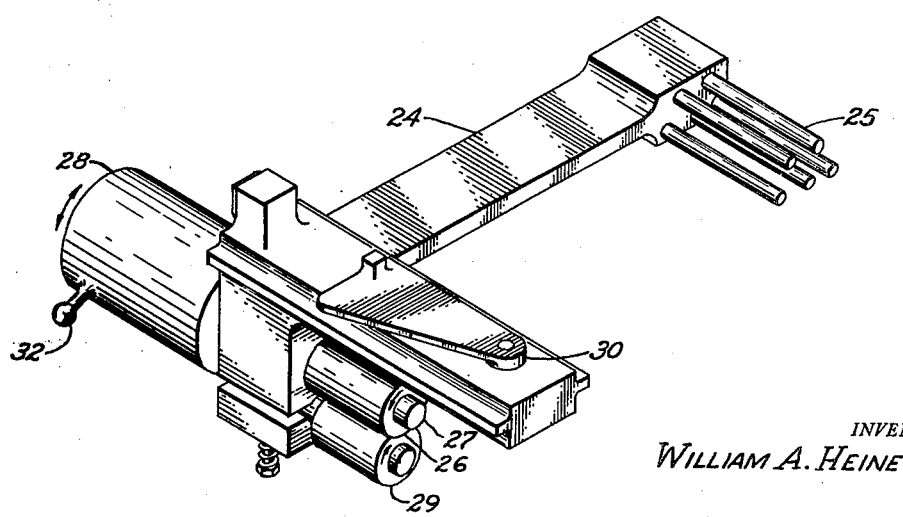

In the drawings, FIG. 1 is a front elevation of the device; FIG. 2 is a side elevation of the device defined by line 2—2 of FIG. 1; FIG. 3 is a section on the line 3—3 of FIG. 2; and FIG. 4 is a pictorial drawing of the tape advance assembly shown in FIG. 1 and FIG. 2.

The marking machine is operated from a capstan or measuring device which consists of a frame 1 on which is mounted a pair of rollers 3 and 4 which engage the cable between them so that the roller 4 measures the length of cable drawn between them and operates the marking machine through a chain 8 which drives a sprocket 9 on the shaft 13 of the numbering mechanism. By a proper relationship of the diameter of measuring roller 4 and sprockets 7 and 13 an accurate rotational movement is obtained.

The marking is done at regular intervals by heated dies 10 and 11 which press against a strip of tape 12, which has a surface of thermally actuated pigments and resins which are transferred to the surface of the cable by contact with the heated dies. The product, such as a cable, is guided and supported through the device from rollers 3 and 4 on roller 38. The heat of the dies causes the thermally active resinous pigmented mixture to be transferred to the surface, into the indentation thus formed on the product so as to leave a legible durable insignia on said product.

The marking mechanism proper comprises a shaft 13 to which is mounted for rotation a carrying arm 14 for the dies 11 and a numbering head assembly 15 containing the dies 10. The carrying arm is in a chamber 16 which is heated as are the dies by heaters 17 and 18 by means of radiation and convection of heat. The ratio of sprockets 7 and 9 and of their drive mechanism is such as to cause the dies 10 and 11 to travel at the same linear velocity as the cable 6 so that they engage the cable transverse to its length without any longitudinal slipping. The circumference of the circle wihch the dies 10 and 11 describe together with the drive ratios determine the interval of imprint, say two feet, three feet, one meter, etc. The marking head comprises a numbering mechanism bearing numbering dies 10, which is indexed each revolution of the carrying arm to impress upon the product a number corresponding to the length of product that has passed through the device. The marking head is caused to index by the movement of the marking head arm. Rollers 19 attached to this arm are engaged in a slot in slide assembly 20 which is caused to be moved up and down the face of the carrying arm 14 by the cam follower 21 attached thereto. The cam follower is in a fixed cam slot 22 and as the carrying arm 14 with the slide assembly 20 attached is caused to rotate the eccentricity of the cam traverses the slide assembly across the face of the carrying arm and rotates the marking head arm causing the numbering dies to index by proper increment. The rotation of the carrying arm is continuous with the passing of the product through the device and its measuring system. The pigmented tape is stored on reel 23 and supported, traversed and advanced in the device on the tape advance assembly shown in FIG. 4.

The tape advance assembly comprises a frame 24 to which are mounted tensioner rolls 25, pressure roller 29, bellcrank 30, and a drive roller assembly. The drive roller assembly comprises a common shaft 27 to which is mounted a drive roller 26 and an over-running clutch 28. The tape is fed through the tensioner rolls 25 which tend to keep the tape taut and smooth during the marking operation and prevent overfeed which would incur malfunction of the device. The tape then passes over the cable 6 and around a rubber covered drive roller 26. Contact of the tape with the drive roller is insured by the pressurized roller 29. This roller may be rubber covered and crowned to insure a straight feed.

The tape advance assembly is caused to operate by the arm 31 attached to the shaft 13. Arm 31 is so designed and mounted as to contact bellcrank 30 and cause the tape advance assembly to traverse at the same linear velocity as the cable 6 and the marking dies 10 and 11. As the advance assembly carries the tape with the product, the clutch actuator 32 traverses in the fixed cam slot 33 causing the clutch to rotate and slip on shaft 27 with no resultant transverse movement of the tape during the marking operation. After the dies 10 leave the tape 12, continued traverse of the advance assembly causes bellcrank 30 to contact fixed roller 34 which pushes the bellcrank laterally to disengage it from the arm 31. Springs 35 then return the advance assembly to the start position against stop 36. During the return the clutch actuator 32 again causes the clutch to rotate, this time in the opposite direction, whereupon it engages the shaft 27 and causes the drive roller 26 to rotate and advance the tape 12 a predetermined increment so that an unused portion of the tape is presented to the dies during the next marking cycle.

The reduced feed fate of the tape make it feasible to store an additional roll of tape on reel 37 and as the tape from reel 23 is expended the tape from reel 37 can be spliced to it without interruption of the marking operation.

Further, the traverse of the tape across the cable permits utilization of a larger percentage of available tape area as well as the use of a wider tape, as compared to a tape mechanism feeding a narrow strip parallel with the length and movement of the product. The wider tape gives greater tinsile strength which results in greatly reduced tape breakage and consequential interruption of the marking operation.

What I claim:

A device for marking a cable as it is being laid with footage numbers indicating the footage that has been laid, said device comprising a frame, support wheels mounted thereon over which the cable is linearly fed, a measuring wheel mounted for rotation on said frame and in peripheral contact with said cable so as to be driven thereby, a rotary marking wheel mounted on said frame and driven by a non-slip drive means from said measuring wheel, a consecutive numbering machine on the periphery of said marking wheel having settable numbering dies positioned to intermittently roll onto said cable with every revolution of the marking wheel at intervals fixed by the measuring wheel, means for advancing the numbering wheels one unit upon each revolution of the marking wheel, a strip frame mounting a pigmented strip extending perpendicularly across the cable between the marking wheel and the cable so as to be in position to be pressed against said cable by the numbering dies as they roll onto said cable, means mounting said strip frame for reciprocating movement parallel to the direction of movement of said cable, drive means for moving said strip frame and pigmented strip in one direction at a velocity substantially equal to that of the cable during the marking operation and spring means for moving said strip frame in an opposite direction to restore same to its original position after termination of the marking operation so as to complete the cycle of operation.

References Cited by the Examiner

UNITED STATES PATENTS

| | | | |
|---|---|---|---|
| 224,537 | 2/80 | Hoster | 101—74 |
| 1,814,432 | 7/31 | Conklin et al. | 101—75 |
| 1,958,717 | 5/34 | Schake et al. | 101 |
| 2,168,431 | 8/39 | Olson | 101—244 X |
| 2,825,279 | 3/58 | Gottscho | 101—75 |
| 2,864,309 | 12/58 | Brownlee | 101—244 |

WILLIAM B. PENN, *Primary Examiner.*